(12) United States Patent
DiSabatino

(10) Patent No.: US 6,691,752 B2
(45) Date of Patent: Feb. 17, 2004

(54) HIGH ROTATION FELLING HEAD MECHANISM

(75) Inventor: Benjamin DiSabatino, Brantford (CA)

(73) Assignee: Timberjack Inc., Woodstock (CA)

( * ) Notice: Subject to any disclaimer, the term of this patent is extended or adjusted under 35 U.S.C. 154(b) by 0 days.

(21) Appl. No.: 09/952,406

(22) Filed: Sep. 14, 2001

(65) Prior Publication Data

US 2003/0205291 A1 Nov. 6, 2003

Related U.S. Application Data

(60) Provisional application No. 60/233,020, filed on Sep. 15, 2000.

(51) Int. Cl.[7] .............................................. A01G 23/08
(52) U.S. Cl. ........................ 144/34.1; 144/4.1; 144/336
(58) Field of Search ........................ 144/41, 39.1, 335, 144/336; 414/680, 729, 739, 695, 695.5, 695.7

(56) References Cited

U.S. PATENT DOCUMENTS

| | | | |
|---|---|---|---|
| 2,681,739 A | 6/1954 | Gokey | |
| 3,027,026 A | 3/1962 | Couquet | |
| 3,081,891 A | 3/1963 | Przybylski | |
| 3,197,049 A | 7/1965 | Schwing | |
| 3,217,910 A | 11/1965 | Waite | |
| 3,278,046 A | 10/1966 | Schumaker | |
| 3,495,727 A | 2/1970 | Long | |
| 3,498,350 A | 3/1970 | Maradyn | |
| 3,550,794 A | 12/1970 | Suverkrop | |
| 3,799,331 A | 3/1974 | Dutton | |
| 3,840,132 A | 10/1974 | Howells, Jr. et al. | |
| 4,134,505 A | 1/1979 | Watanabe | |
| 4,412,569 A | 11/1983 | Barnett et al. | |
| 4,412,777 A | 11/1983 | Forslund | |
| 4,552,191 A | 11/1985 | Kuusilinna | |
| 5,074,740 A | 12/1991 | Weigel | |
| 5,109,900 A | 5/1992 | Gilbert | |
| 5,291,926 A | 3/1994 | Jansson | |
| 5,553,993 A | * 9/1996 | Gilbert et al. | ................ 144/30 |
| 5,590,699 A | * 1/1997 | Gilbert et al. | ............. 144/336 |
| 5,595,225 A | 1/1997 | Gilbert et al. | |
| 5,934,147 A | * 8/1999 | Parker | ..................... 414/695.5 |
| 5,975,166 A | * 11/1999 | MacLennan | ................ 144/335 |

* cited by examiner

*Primary Examiner*—Allen Ostrager
*Assistant Examiner*—Shelley Self
(74) *Attorney, Agent, or Firm*—Quarles & Brady, LLP

(57) ABSTRACT

A tree felling saw head has two pairs of links and two hydraulic actuators to provide high rotation of the head relative to a mounting adapter in a lateral plane which is perpendicular to a cutting plane.

7 Claims, 8 Drawing Sheets

HIGH ROTATION FELLING HEAD MECHANISM

CROSS-REFERENCE TO RELATED APPLICATION

This claims the benefit of U.S. Provisional Patent Application No. 60/233,020 filed Sep. 15, 2000.

STATEMENT CONCERNING FEDERALLY SPONSORED RESEARCH OR DEVELOPMENT

Not applicable.

FIELD OF THE INVENTION

The present invention relates to tree felling heads, and in particular to a mechanism for rotating a tree felling head through a large angle relative to its mount in a lateral plane which is perpendicular to the cutting plane.

BACKGROUND OF THE INVENTION

Heads for felling trees are well known for mechanized tree harvesting and generally include a relatively tall frame having hydraulically operated arms for holding a tree and a cutting mechanism such as a disc saw, shear or other cutting mechanism at the base of the frame for cutting off the tree. The arms are closed around the tree while it is being cut, and after it is cut, the arms sweep the tree rearwardly or to the side against the frame, typically over a butt plate which supports the bottom end of the tree, to hold the tree until it is unloaded. The felling head is typically mounted to a heavy duty vehicle, such as to the front of the boom of a swing-to-tree feller machine or to the front of a drive-to-tree machine.

The mounting of the head to the front of the machine typically provides for pivoting of the head relative to the machine in a plane which is lateral (side to side) and perpendicular to the plane of cut (the cutting plane). One such mount and a mechanism for rotating it are disclosed in U.S. Pat. No. 5,590,699. U.S. Pat. No. 5,590,699 discloses a high rotation mechanism having a pair of arc-shaped links 70, 72 pivotally connected to each other at an intermediary junction 76 and to the head at 74 and to a boom of a swing-to-tree feller buncher at 78. A hydraulic actuator 60 has its cylinder pivotally connected to the frame of the head and its piston pivotally connected to the intermediary junction. Thus, a single cylinder is used to provide a stated range of angles of ±90° (a total of 180°) and over, although column 3, lines 58–61 indicates that it is perhaps better used at under 45° (a total of 90°).

It is desirable that rotation mechanisms for felling heads have as high of a range of angular movement as possible. One reason for this is that when a tree is held by the head, it may be necessary to lay the tree down, particularly with a swing-to-tree feller buncher so that it lies generally parallel to a bundle of trees already cut or in a particular position. The higher that the head can pivot, the less that the machine must be driven from one location to another to place the tree in the desired location.

In addition, the rotation mechanism should have sufficient torque in the vertical position so as to counteract forces exerted on the head by trees being held and sufficient torque to guide the trees being held as they are placed parallel to a pile on the ground. Typical trees stand a considerable distance above the base of the head and the wind may be blowing. Therefore, it is important that, particularly in the vertical position of the head, maximum and balanced power is exerted on the head to maintain stability of the tree and head. At the extreme positions of the angular range of motion, the torque exerted on the head must be sufficient to manipulate the tree for precise placement, and also to return the head to the vertical position. In addition, the envelope of the head including the mechanism for rotating the head should not hamper the normal movement and manipulation of the head in the forest.

SUMMARY OF THE INVENTION

The invention provides a high rotation mechanism for a felling head which includes two pairs of links. The links of each pair are pivotally mounted to each other at an intermediary point, one end of each pair is pivotally mounted to the head and the other end of each pair is pivotally mounted to the pivot mounting structure relative to which the head is pivotable about a pivot axis. Each pair is driven by a separate hydraulic actuator which has one of its ends pivotally mounted to one of the links of each pair and its other end pivotally mounted to either the head or the mounting structure, but preferably the head. This mechanism is mounted to the head and pivot mounting structure so as to rotate the head in either direction from vertical in a lateral plane of rotation which is generally perpendicular to the cutting plane.

This construction can provide 220° or more of total rotation in the plane of rotation. This is achieved by using two cylinders and skewing the torque curve of the crank/link mechanisms. At full rotation, one side loses torque and most or all of the torque exerted on the head comes from the opposite side cylinder. In the vertical position of the head torque is balanced in both directions and the torque is at or near its maximum. Torque is at or near its minimum in either extreme position of rotation.

The present invention also results in a design which has no exposed gears and no timing mechanisms, and which can be connected directly to the existing carrier vehicle hydraulics. All joints can be simple pin connections and the mechanism operates within a relatively stall envelope.

These and other objects and advantages of the invention will be apparent from the drawings and detailed description.

DETAILED DESCRIPTION OF THE PREFERRED EMBODIMENT

Figure 1:
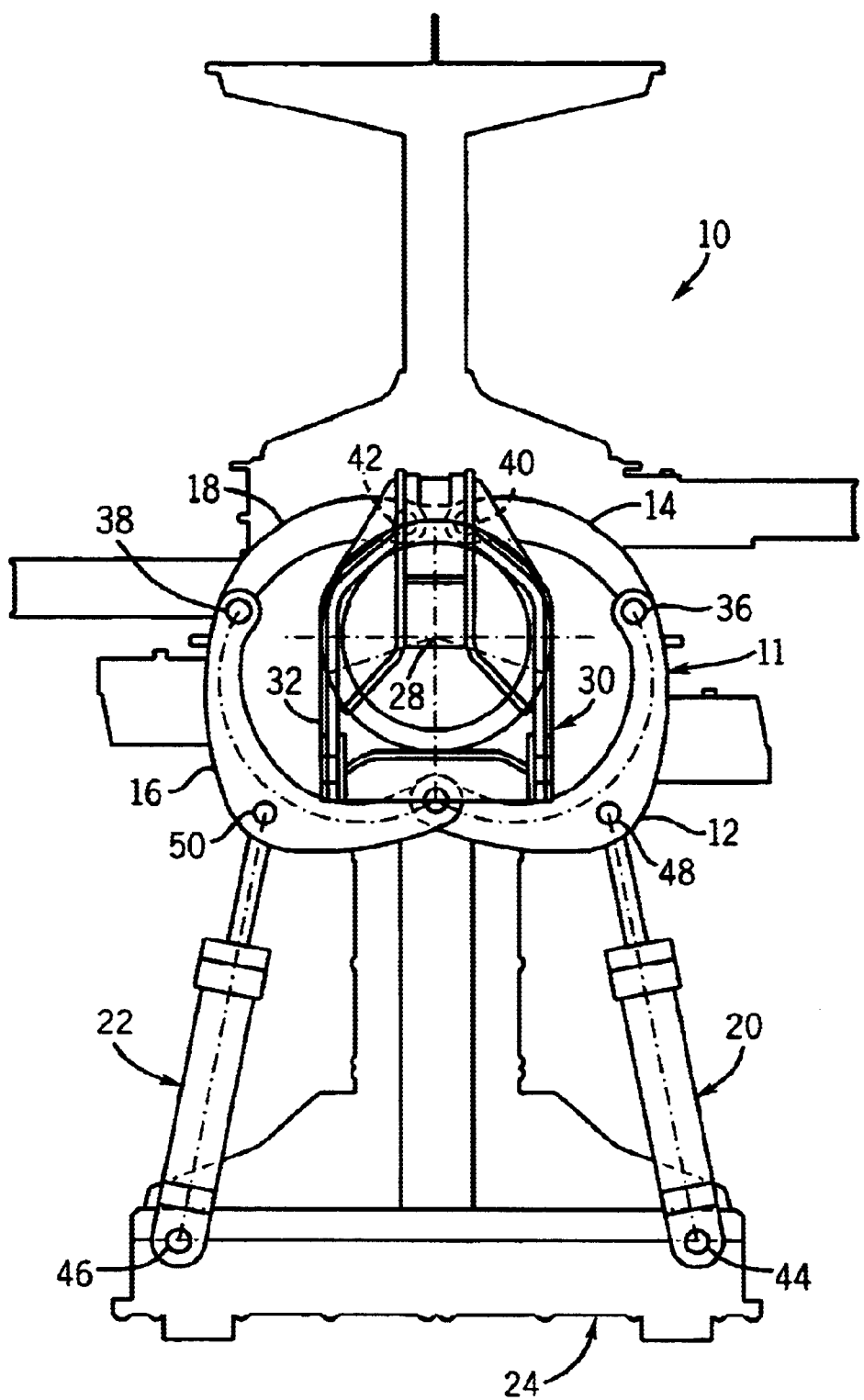
FIG. 1 is a rear plan schematic view of a felling head and mounting structure incorporating the invention in the vertical position.
Figure 3:
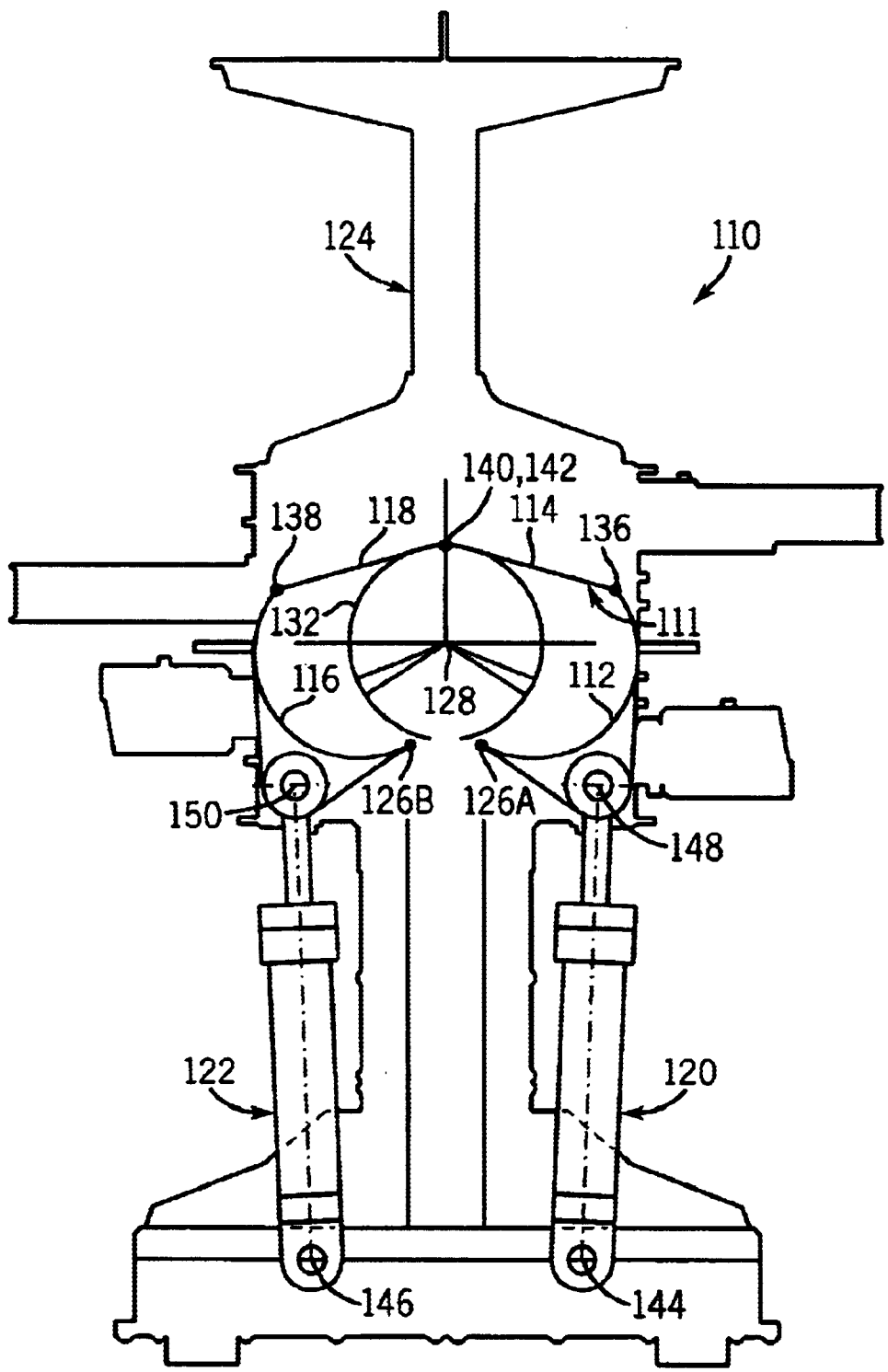
FIG. 3 is a schematic view, similar to FIG. 1, of an alternate mechanism which yields an increased range of rotation.

Referring to FIG. 1, a saw head 10 incorporating a mechanism 11 of the invention has four links 12 14, 16 and 18 and two hydraulic actuators 20 and 22. The lower ends of links 12 and 16, which also may be referred to as cranks 12 and 16, are pivotally connected by simple pin connections to the frame 24 (schematically depicted) of the head either at the same head pivot axis 26 as illustrated or at different head pivot axes (FIG. 3). This axis is parallel to the pivot axis 28 which is established by the mounting adapter 30. The mounting adapter 30 has a frame 32 which is typically mounted to the end of the boom of a swing-to-tree machine. Frame 24 is pivotable about axis 28 relative to the frame 32 in a lateral plane which is generally perpendicular to the cutting plane by a bearing which is conventional and included in the mounting adapter 30. The mounting adapter 30 could also be mounted to other types of machines. The axes of all pivot pin connections of the mechanism 11 are substantially parallel to the axis 28, so that all of the links 12, 14, 16, 18 and actuators 20, 22 also pivot in lateral planes which are generally perpendicular to the cutting plane when the mechanism is operated.

The ends of the cranks 12 and 16 which are opposite from the axis 26 are pivotally connected to respective links 14 and 18 by pin connections to pivot about intermediate pivot axes 36 and 38, and the links 14 and 18 extend from the respective pin connections having axes 36 and 38 to ends which are pivotally connected by pin connections to the adapter frame 32 to pivot about adapter pivot axes 40 and 42. The lower end of each of the actuators 20 and 22 is pivotally connected by pin connections to pivot about respective actuator pivot axes 44 and 46 relative to the frame 24 and the upper ends 48 and 50 of the respective actuators 20 and 22 are pivotally connected by pin connections to rotate about respective actuator pivot axes relative to the respective cranks 12 and 16 between the two ends of the cranks 12 and 16. The closer that the connections 48 and 50 are to the axis 26, the shorter the stroke of the actuators 20 and 22 required will be.

Figure 2:
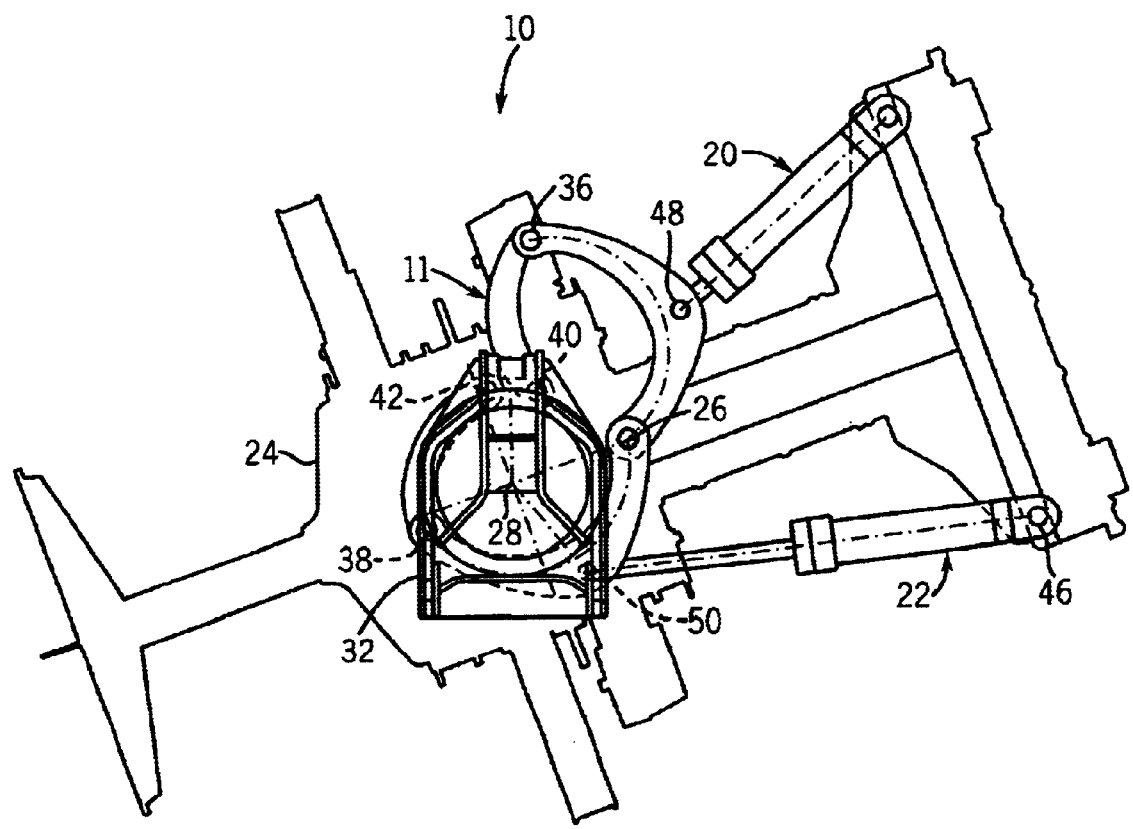
FIG. 2 is a view similar to FIG. 1 but with the mechanism in an extreme counterclockwise limit of rotation.

Referring to FIG. 2, high rotation is achieved in this mechanism, for example ±110° or more from the vertical position of FIG. 1, for a total range of 220° or more in the embodiment of FIGS. 1 and 2. FIG. 2 illustrates the head 10 in the extreme position in which the frame 24 is swung counterclockwise relative to the mounting adapter frame 32. As illustrated, in this position the axes 28, 40 and 36 are generally in line so that the ability of the actuator 20 to exert torque on the head 24 is very small or lost completely. However, the actuator 22 is still able to exert torque on the frame 24 and therefore accounts for substantially all of the torque exerted on the head 24 in the extreme counterclockwise position. In the opposite extreme position, i.e., the extreme clockwise position, in which the head 24 is swung to its limit clockwise relative to the mounting adapter frame 32, the actuator 22 loses its ability to exert torque on the frame 24 since the axis 28, pivot 42 and intermediate pivot 38 become generally lined up, and the actuator 20 exerts substantially all of the torque in that position on the frame 24.

Thus, it can be seen that in the vertical position shown in FIG. 1, i.e., the position which is midway between the two extreme positions, the torques exerted by the actuators 20 and 22 on the frame 24 are substantially equal and balanced. Since both actuators 20 and 22 are contributing substantially to the torque exerted on the frame 24, the torque exerted on the frame 24 is maximum. In addition, the torque is balanced in the vertical position, that is, the torque is the same in both directions. Also, as shown in the illustrations, the mechanism 11 is relatively small and does not appreciably increase the overall width or height of the head. The high torque exerted in both directions in the vertical position provided by the invention allows the head to be easily handled with a full load of trees and the reduced torque at full rotation is still adequate for placing trees on the ground or in a pile at a desired orientation and returning the empty head to the vertical position.

The mechanism could also be reversed, whereby the actuators 20, 22 and cranks 12, 16 are pinned to the mounting adapter frame 32 and the respective links 14 and 18 are pinned to the saw head frame 24.

Figure 4:
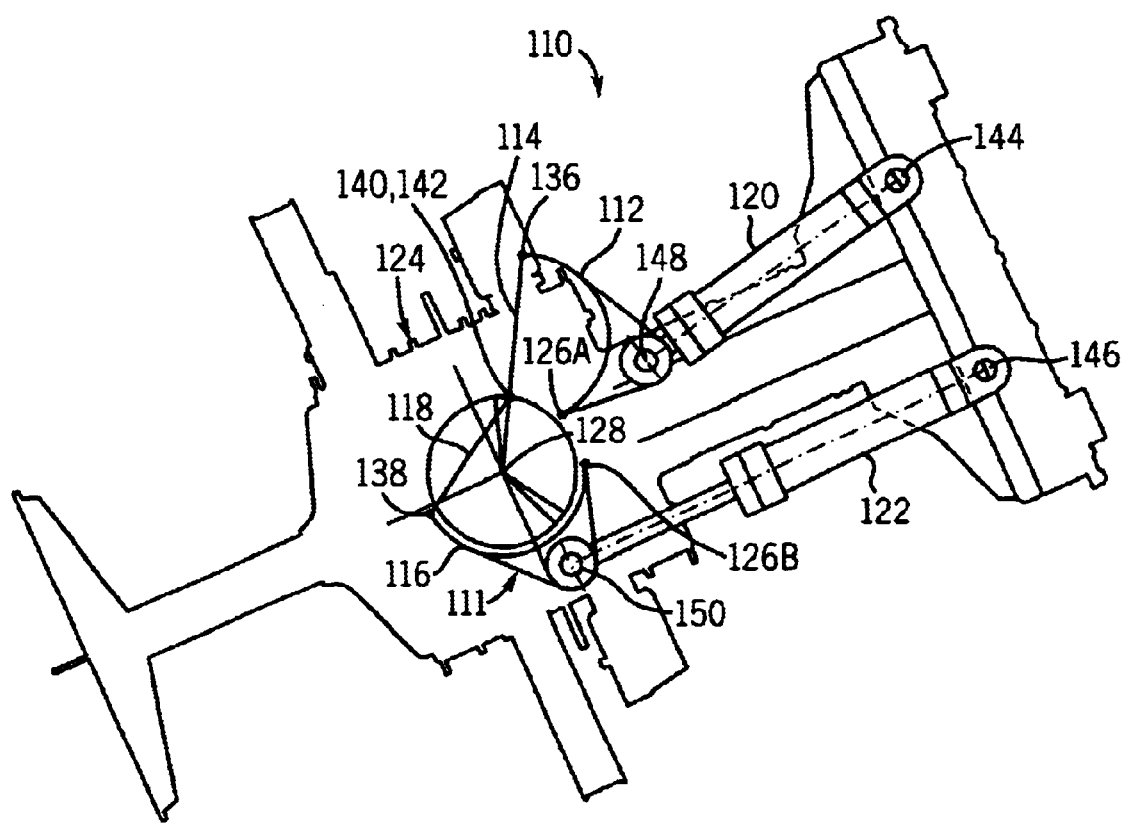
FIG. 4 is a view like FIG. 2, but with the mechanism of FIG. 3.
Figure 5:
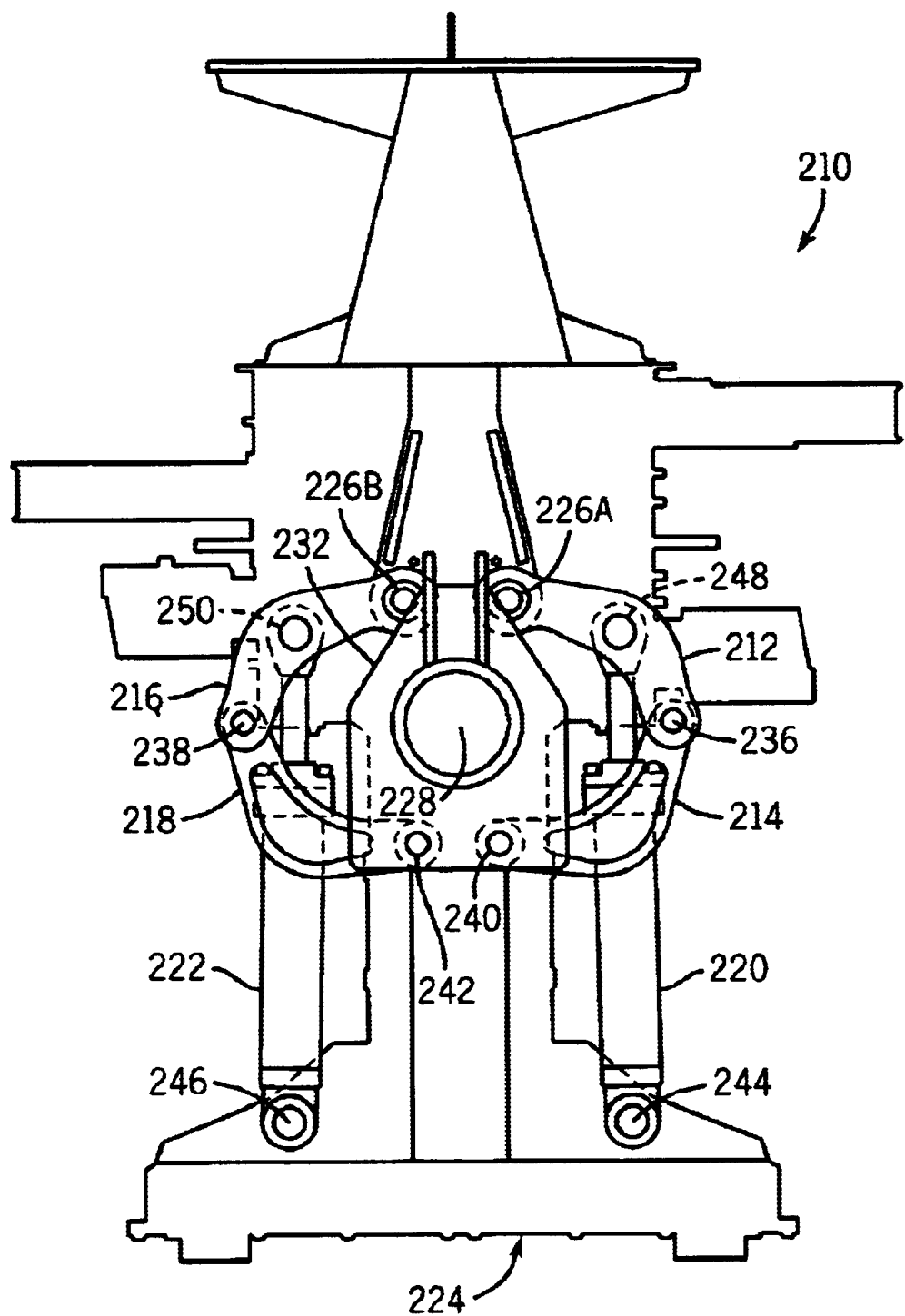
FIG. 5 is a schematic view, similar to FIG. 1, of a second alternate mechanism.
Figure 6:
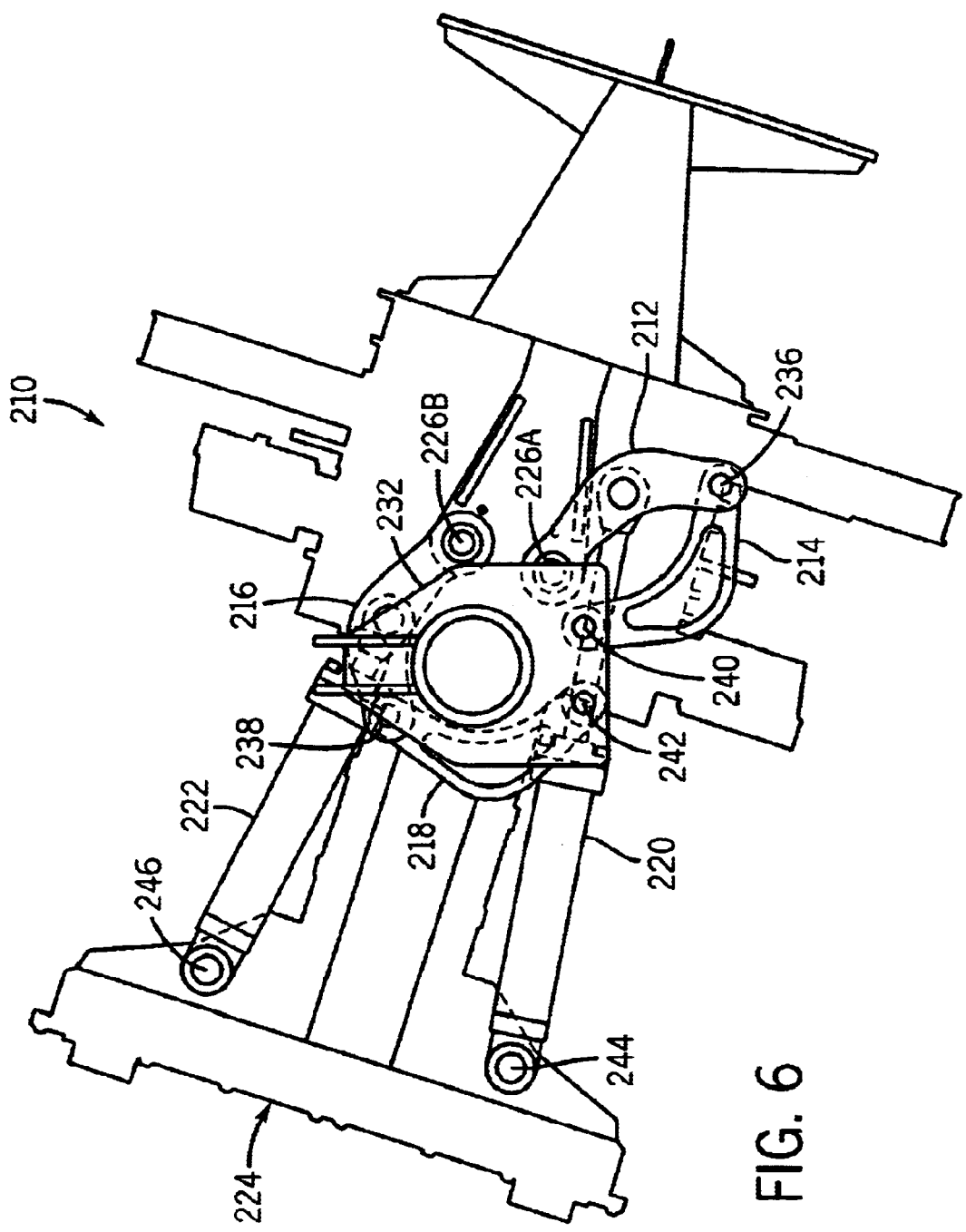
FIG. 6 is a view like FIG. 2, but with the mechanism of FIG. 5.

FIGS. 3 and 4 illustrate a modified embodiment of the invention, similar to the embodiment 10 described above, but which is capable of achieving a rotation of ±120° from vertical (a total of 240°). The full links are not shown, and the mounting adapter frame also is not shown, but FIGS. 3 and 4 do show the pivot points of the four links and two actuators. Corresponding elements are labeled with the same reference number as in the embodiment 10, plus 100.

Whereas the pivots 26 of the cranks 12 and 16 were coaxial and pivots 40 and 42 of the links 14 and 18 were spaced in the embodiment 10, the opposite is true in the embodiment 110. Therefore, the cranks 112 and 116 are pinned at respective axis 126A and 126B to the frame 124, and the pivots 140, 142 are pivotally connected to the adapter frame 132 along a single axis.

FIGS. 5–8 illustrate a second alternate embodiment 210 of the invention, similar to both of the afore-illustrated embodiments, but with the actuators 220, 222 offset (forwardly) from the plane of the links 212, 214, 216, 218, and with the upper ends of the links 212, 216 pinned at 226A. 226B to the head frame 224 and the lower ends 240, 242 of the links 214, 218 pinned to the adapter frame 232. This assembly also results in achieving a rotation on the order of ±120° from vertical, but also permits a reduction in the overall height of the rotation mechanism, resulting in the possibility of reducing the height of the head.

Figure 7:
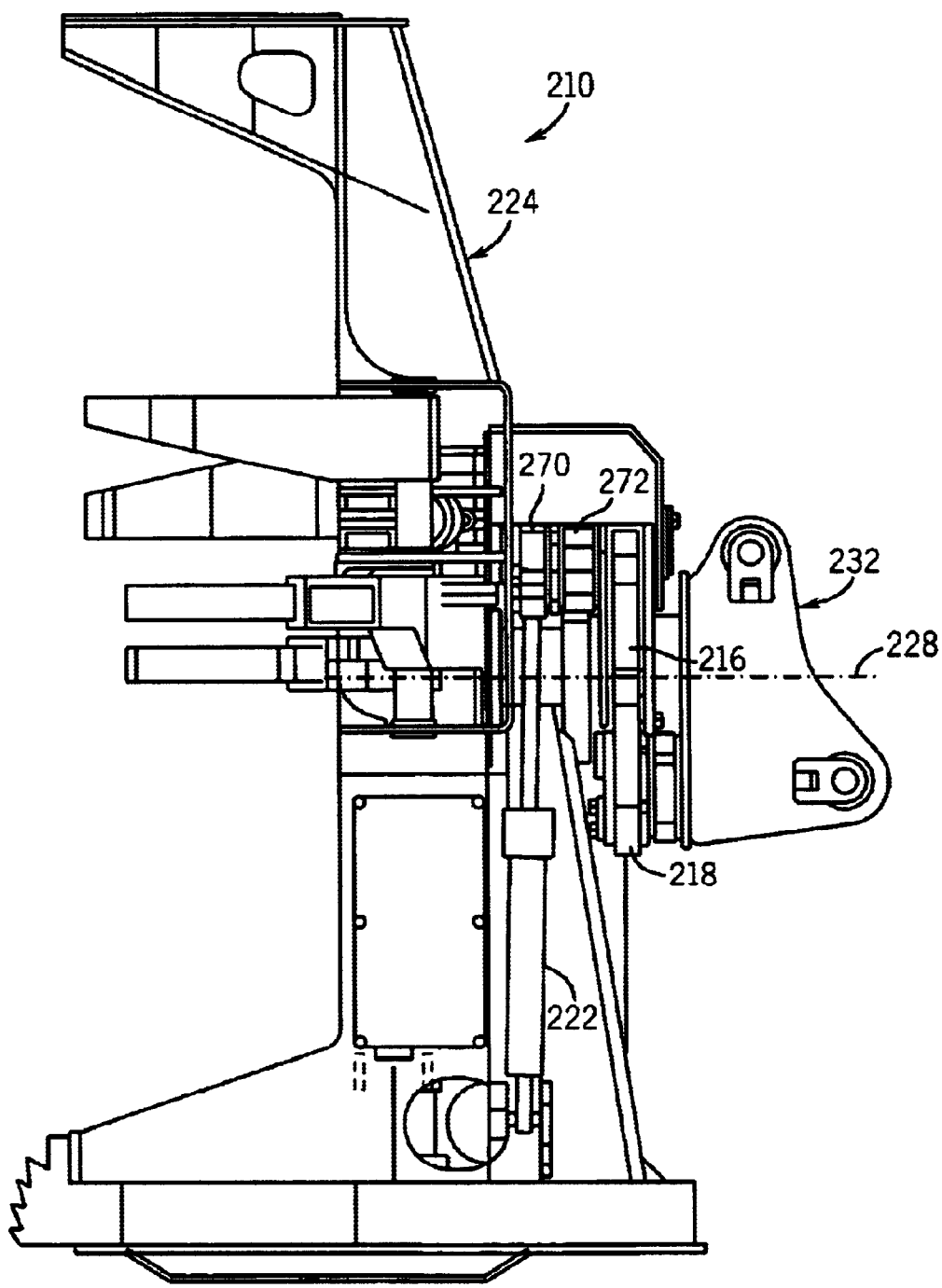
FIG. 7 is a side plan view of the head of FIGS. 5 and 6.
Figure 8:
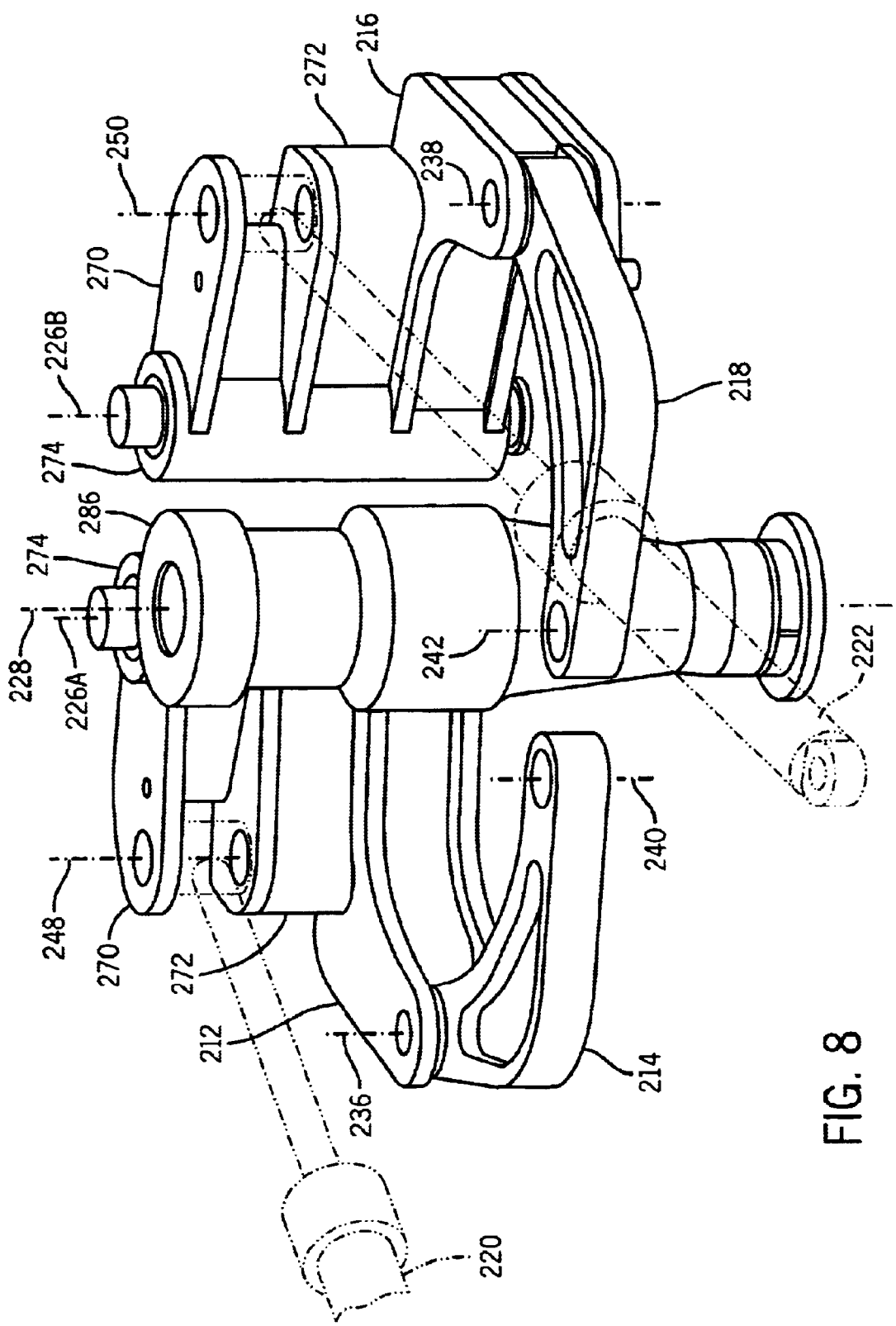
FIG. 8 is a perspective view of the link mechanism for the second alternate embodiment, with the hydraulic actuators shown in phantom.

In the head 210, the actuators 220,222 are offset forwardly from the links 212, 214,216, 218, as shown in FIG. 7. This is accomplished, as shown in FIG. 8, by providing a crank 270 with each respective link 212, 216 in a single weldment. FIG. 8 also illustrates the spindle 286 which defines the head pivot axis 228. Each crank 270 is offset forwardly from its respective link 212 or 216 and is connected to its respective link 212 or 216 by a tube 272, which is welded between each crank 270 and the respective link 212 or 216 and also by a tube 274 which is coaxial with the respective pivot axis 236 or 238. This offsetting of the points of connection of the actuators 220, 222 to the links 212, 216 enables reducing the distance from the respective pivots 244, 246 to the head pivot axis 228, thereby enabling reducing the height of the pivot mechanism and of the head overall. It should also be noted that the pivots 244, 246 of the actuators 220, 222 could be moved to different points on the head frame 224, such as to points above the links 212, 216.

Many modifications and variations to the preferred embodiment described will be apparent to those skilled in the art. For example, whereas in the first embodiment only the lower pivot 26 of both pairs of links is coaxial, in the second embodiment only the upper pivot 140, 142 is coaxial, and in the third embodiment both sets of pivots are separate (not coaxial), and a different combination of separate or coaxial pivots could possibly be made, or a different combination of separate or coaxial upper or lower pivots being connected to either the adapter frame or the head frame. Therefore, the invention should not be limited to the embodiments described, but should be defined by the claims which follow.

I claim:

1. A mechanism for rotating a tree felling head relative to a mounting adapter frame to which the felling head is rotatably connected to rotate a frame of said tree felling head about a head pivot axis, said mechanism comprising:

two pairs of links, the links of each pair being pivotally connected at one end to each other to pivot about an intermediate pivot axis, one end of each pair being pivotally connected to a frame of the mounting adapter to pivot about an adapter pivot axis and the other end of each pair being pivotally connected to a frame of the felling head to pivot about a head pivot axis;

a pair of hydraulic actuators, one of said actuators for each of said pairs of links, each of said actuators being pivotally connected between one of the links of the corresponding pair and one of said frames so as to pivot relative to said link and said frame about respective actuator pivot axes;

wherein said pivot axes of said actuators and links are substantially parallel to said head pivot axis and said actuators can pivot said head through a total range of motion of 180° or more.

2. A mechanism as in claim 1, wherein said actuators have their lower ends pivotally mounted to said frame of said head.

3. A mechanism as in claim 1, wherein one axis of one pair of links is coaxial with at least one axis of the other pair of links.

4. A mechanism as in claim 1, wherein said head axes of said pairs of links are coaxial with each other.

5. A mechanism as in claim 1, wherein said adapter axes of said pairs of links are coaxial with one another.

6. A mechanism as in claim 1, wherein said adapter axes of said pairs of links are not coaxial with one another.

7. A mechanism as in claim 1, wherein said head axes of said pairs of links are not coaxial with one another.

* * * * *